Oct. 8, 1929.   L. W. HASSENSALL   1,730,728
BEVERAGE DISPENSING AND COOLING APPARATUS
Filed Jan. 27, 1928
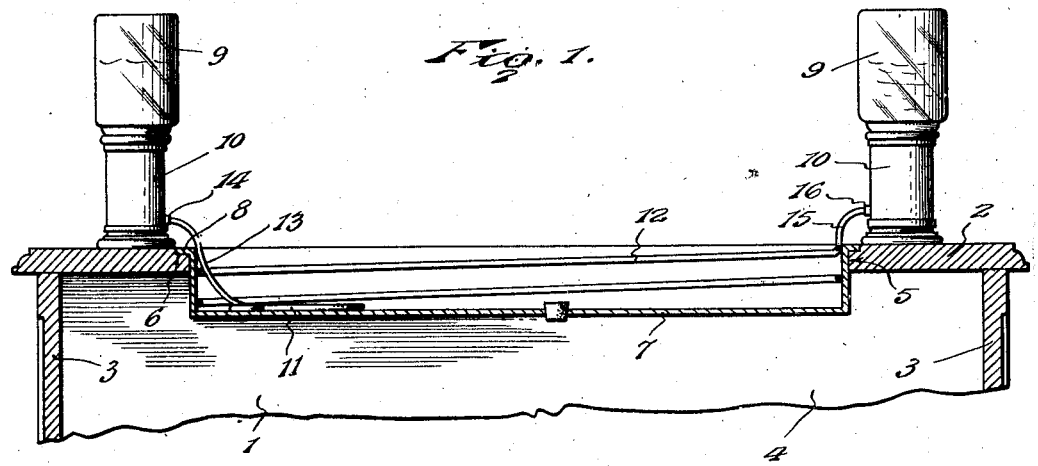
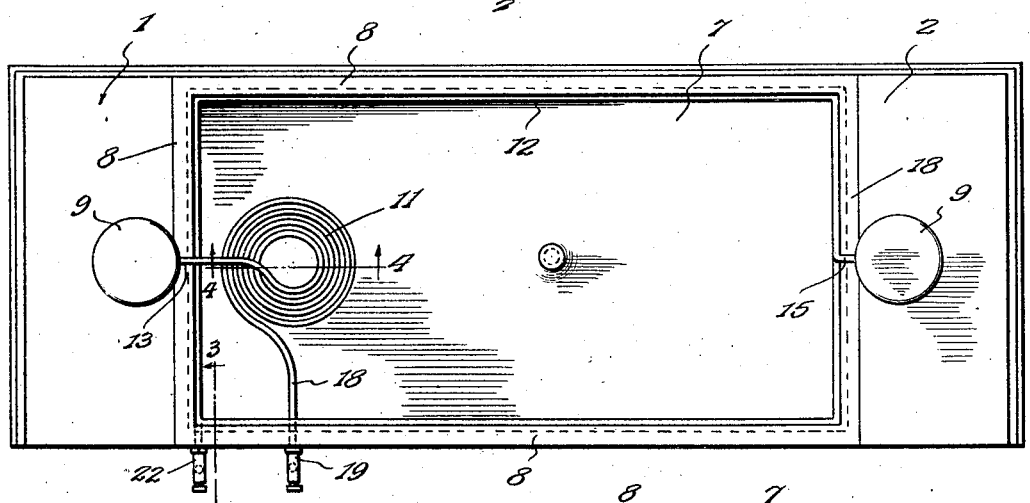
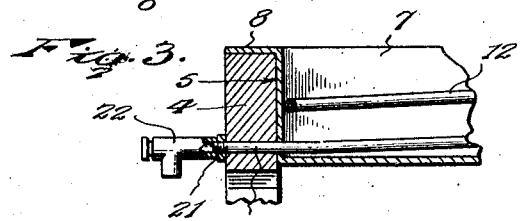
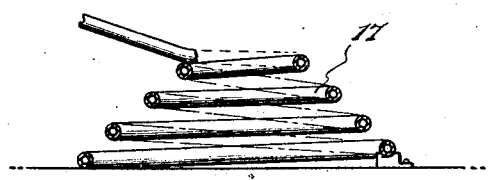
Inventor
L. W. Hassensall.
By Lacy & Lacy, Attorneys Patented Oct. 8, 1929

1,730,728

UNITED STATES PATENT OFFICE

LOUIS W. HASSENSALL, OF AIKEN, SOUTH CAROLINA

BEVERAGE DISPENSING AND COOLING APPARATUS

Application filed January 27, 1928. Serial No. 249,958.

This invention relates to a store apparatus and more particularly to a beverage dispensing device.

At the present time it is customary to dispense soft drinks and other beverages in bottles into which straws are inserted so that the contents of the bottles may be withdrawn through the straws and thereby consumed. These bottles are cooled by placing them in a large pan seated in an opening formed in a counter and containing ice as a cooling medium. This method of dispensing the beverages has been found inconvenient as it requires some time for the contents of the bottles to become properly cooled and in addition it is necessary to place the filled bottles in the pan and also necessary to dispose of the empty bottles.

Therefore, one object of the invention is to provide dispensing means for soft drinks and other beverages wherein the beverage will be stored in a large container which may be referred to as a reservoir or source of supply and fed into a coil disposed within the cooling pan from which it may be allowed to pass into a paper cup or other similar receptacle which is destroyed after being used.

Another object of the invention is to allow the coil to be disposed within a pan already set into an opening formed in a counter thereby making it unnecessary to provide a special pan and also making it unnecessary to provide a counter of a special construction.

Another object of the invention is to so form the coil or coils disposed within the pan that the liquid may easily pass through it and thereby permit the coil to be entirely drained when necessary.

The invention is illustrated in the accompanying drawing, wherein

Figure 1 is a longitudinal vertical sectional view through a counter having the improved beverage dispensing and cooling means applied thereto;

Fig. 2 is a top plan view of the counter and beverage cooling and dispensing means;

Fig. 3 is an enlarged fragmentary sectional view taken on the line 3—3 of Fig. 2, and Fig. 4 is a sectional view taken on the line 4—4 of Fig. 2 but illustrating a modified form of coil.

The counter, which is indicated in general by the numeral 1, is of a conventional construction and includes a top 2, end walls 3 and front and rear walls 4. This counter may be of any desired length and is of the type generally employed in five and ten cent stores at their soda fountains and soft drink dispensing counters. The top 2 is formed with an opening 5 which may be of any desired length and width and about this opening the upper face of the top is recessed to provide a seat 6. A pan 7 fits snugly into the opening 5 and has its walls provided with outstanding flanges 8 which are received in the recess or seat 6. It will thus be seen that the pan will be suspended in the opening where it will be out of the way and may be easily filled with ice or any other cooling medium desired. A suitable drain opening may be provided in the bottom of the pan so that water formed by melted ice may be drained out of the pan.

Instead of placing small bottles of beverage in the pan so that the contents of the bottles may be chilled, I employ large bottles 9 which may be of any desired capacity and these bottles are inverted after their corks are removed and supported upon stands 10 which are of a conventional construction and may contain ice or any other desired cooling medium if it is desired to cool the beverage while it is in the stand which may be referred to as a reservoir or source of supply. Each stand is provided with the usual outlet to which a spigot is usually applied but when the stand is employed as shown in the accompanying drawing the spigot is removed and the outlet pipe of the stand engaged by a coupling carried by a pipe or tube from which a coil is formed. The coils 11 and 12 are disposed within the pan 7 and one rests upon the bottom of the pan and the other extends about the pan against its walls, as shown in Figs. 1 and 2. By referring to these figures, it will be seen that one end portion 13 of the pipe or tube from which the coil 11 is formed extends upwardly out of the pan and carries a coupling 14 removably engaged with the outlet of one of the stands 10 and the corresponding end portion 15 of the tube from which the coil 12 is formed extends out of the pan and carries a coupling 16 removably engaged with the outlet of the other stand or reservoir. The coil 11 which is of a spiral formation may rest flat upon the bottom of the pan, as shown in Fig. 1, or it may be of a conical formation, as shown in Fig. 4 and indicated by the numeral 17, so that the liquid will very easily drain out of the coil and also allow the coil to be very effectively acted upon by the ice or other cooling medium placed in the pan. The end portion 18 of the tube from which the coil 11 is formed extends through registering openings formed in a wall of the pan and the inner side wall 4 of the counter and is engaged by a spigot 19 which is of a conventional construction and serves not only as means to control passage of the beverage out of the coil and into a glass or cup placed beneath the spigot but also constitutes securing means for this end of the tube. The coil 12 which is disposed against the walls of the pan slopes downwardly from its inlet portion 16, as clearly shown in Figs. 1 and 3, and its end portion 20, which corresponds to the outlet end 18 of the tube from which the coil 11 is formed, is passed through registering openings formed in the pan and inner wall of the counter and is threaded, as shown at 21, so that a spigot 22, similar to the spigot 19, may be screwed upon this end of the pipe and serve to secure the pipe as well as regulate flow of beverage through the pipe.

After the apparatus has been installed as shown, ice is placed in the pan and bottles containing beverages are set in place upon the stands. These bottles may contain the same kind of beverage or different beverages, and it will be obvious that, if desired, additional stands may be provided and connected with coils resting upon the bottom of the pan or extending about its walls between the convolutions of the coil 12. The beverage, which may be partially cooled in the stands if so desired, passes through the coils and as it flows through these coils which are embedded in the ice or other cooling medium it will be reduced to a very low temperature. It will thus be seen that a glass or cup placed beneath one of the faucets may be filled with a desired beverage which has been chilled as it passes through the tube to which the faucet is attached. After the beverage has been consumed, the cup is easily disposed of. It will thus be seen that with this apparatus it is not necessary to place filled bottles in the pan and also it is not necessary to dispose of empty bottles. Therefore, a great deal of time and labor will be saved. When it is necessary to clean a coil, the spigot or faucet engaged with the tube from which the coil is formed is opened and by pouring hot water into the receptacle to which the coil is connected the hot water may be allowed to pass freely through the tube and thoroughly clean it. If a coil becomes broken, it can be very easily removed and replaced with a new one.

Having thus described the invention, I claim:

In combination with a counter having walls and a top supported thereby and formed with an opening, and a pan to receive a cooling medium exposed through said opening, containers resting upon the top of said counter, coils in said pan formed of tubing and each having one end portion projecting upwardly out of the pan and adapted to be connected with a container and its other end portion passed outwardly through the wall of the pan, one coil having its convolutions extending about the pan against the walls thereof and sloping downwardly towards the outlet end of the tubing and the other coil resting upon the bottom of the pan, and a faucet connected with the outer end of the last-mentioned end portion of each tube and constituting a fastener for the tube and closure for the opening in the wall through which the tube extends.

In testimony whereof I affix my signature.

LOUIS W. HASSENSALL. [L. S.]